July 22, 1969 G. PHILIPP 3,457,010
DATA RETRIEVAL SYSTEM
Filed Oct. 28, 1966 4 Sheets-Sheet 1

INVENTOR.
GABRIEL PHILIPP
BY

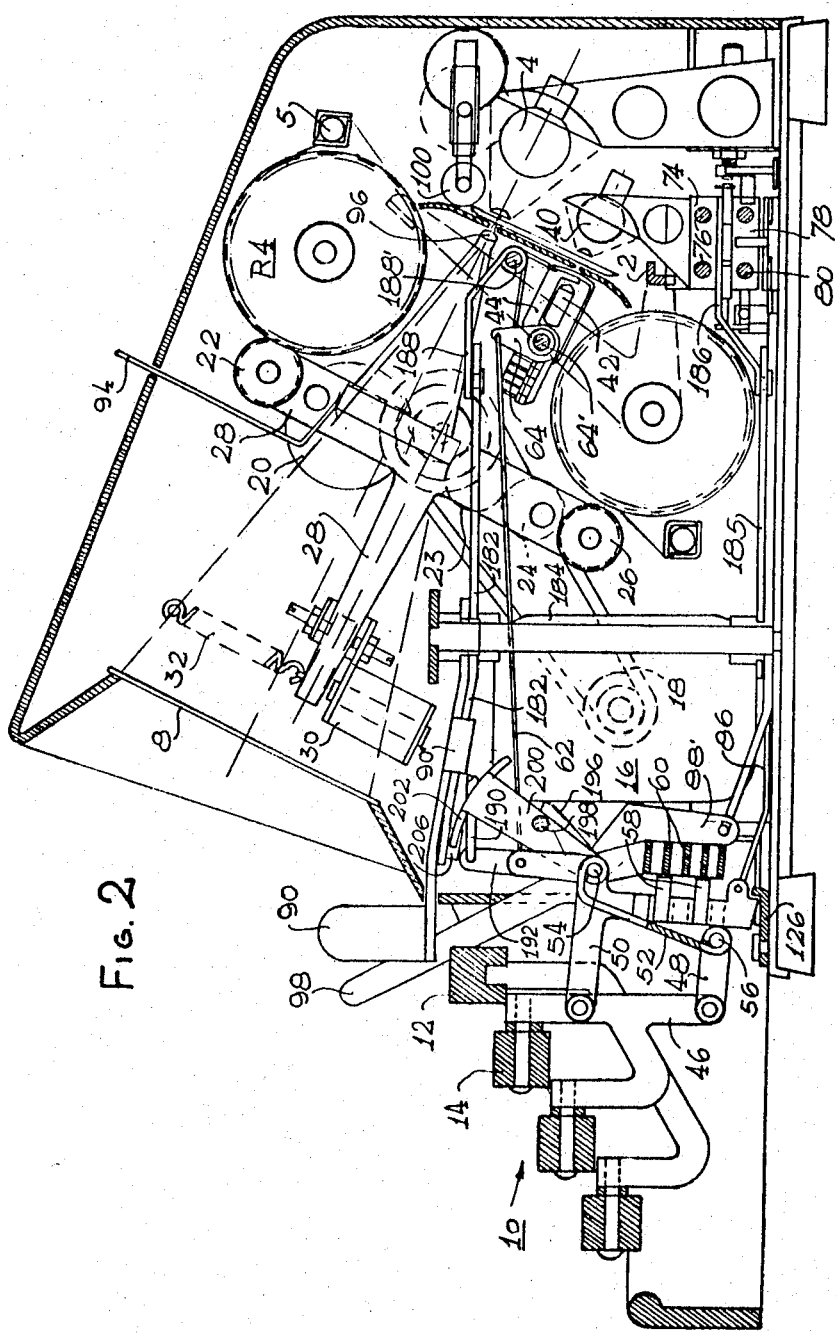

July 22, 1969 G. PHILIPP 3,457,010
DATA RETRIEVAL SYSTEM
Filed Oct. 28, 1966 4 Sheets-Sheet 3
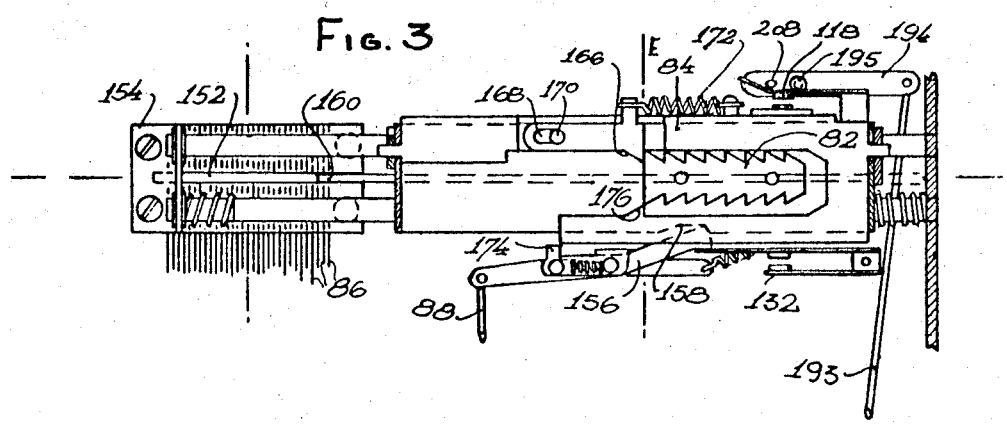
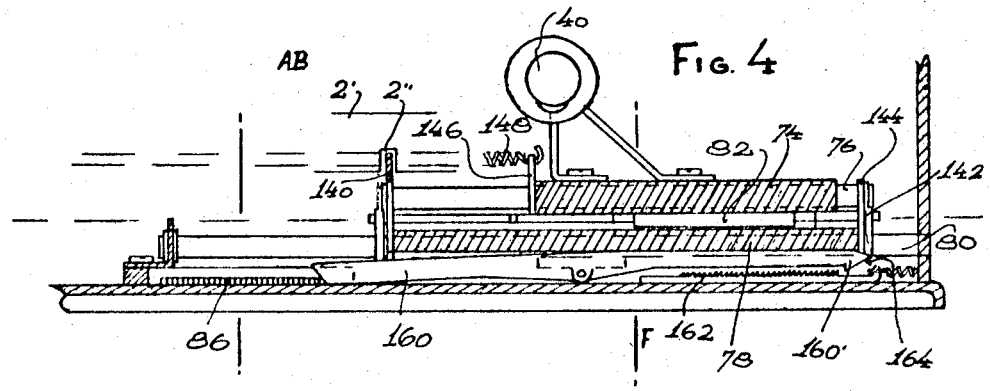
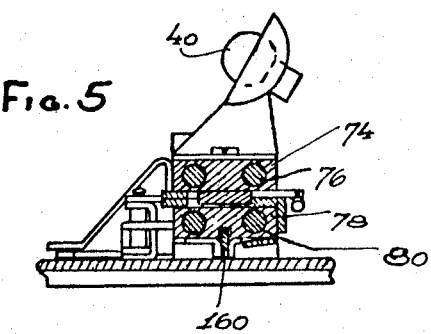
INVENTOR.
GABRIEL PHILIPP
BY

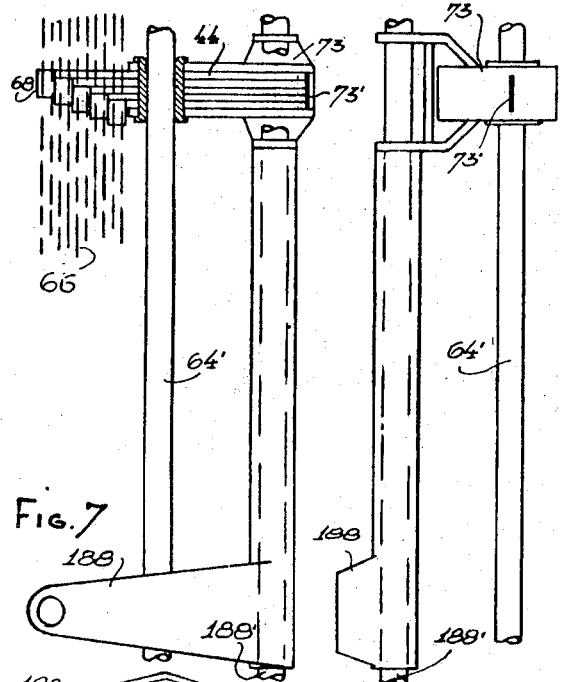

United States Patent Office 3,457,010
Patented July 22, 1969

3,457,010
DATA RETRIEVAL SYSTEM
Gabriel Philipp, Rh. Ein Gedi 2/11, Holon, Israel
Filed Oct. 28, 1966, Ser. No. 590,355
Claims priority, application Israel, Nov. 8, 1965,
24,597
Int. Cl. G03b 23/12
U.S. Cl. 353—26                                10 Claims

ABSTRACT OF THE DISCLOSURE

A data retrieval system for use in retrieving data arranged in alphabetical order, such as in dictionaries and telephone directories. The system comprises a horizontally-shiftable carriage for supporting one or more microfilm reels containing the data in microfilm form arranged alphabetically in columns, and coded address information pertaining to the data. The data retrieval system further comprises an optical projector for projecting the data, a drive for the reel, a key board for introducing an address into the apparatus, carriage-shifting apparatus for shifting the carriage to a predetermined columnar position according to a depressed key, and control apparatus including an address reader sensing the address information on the microfilm for indexing the latter with respect to the optical projecting system according to other depressed keys.

---

Figure 1:
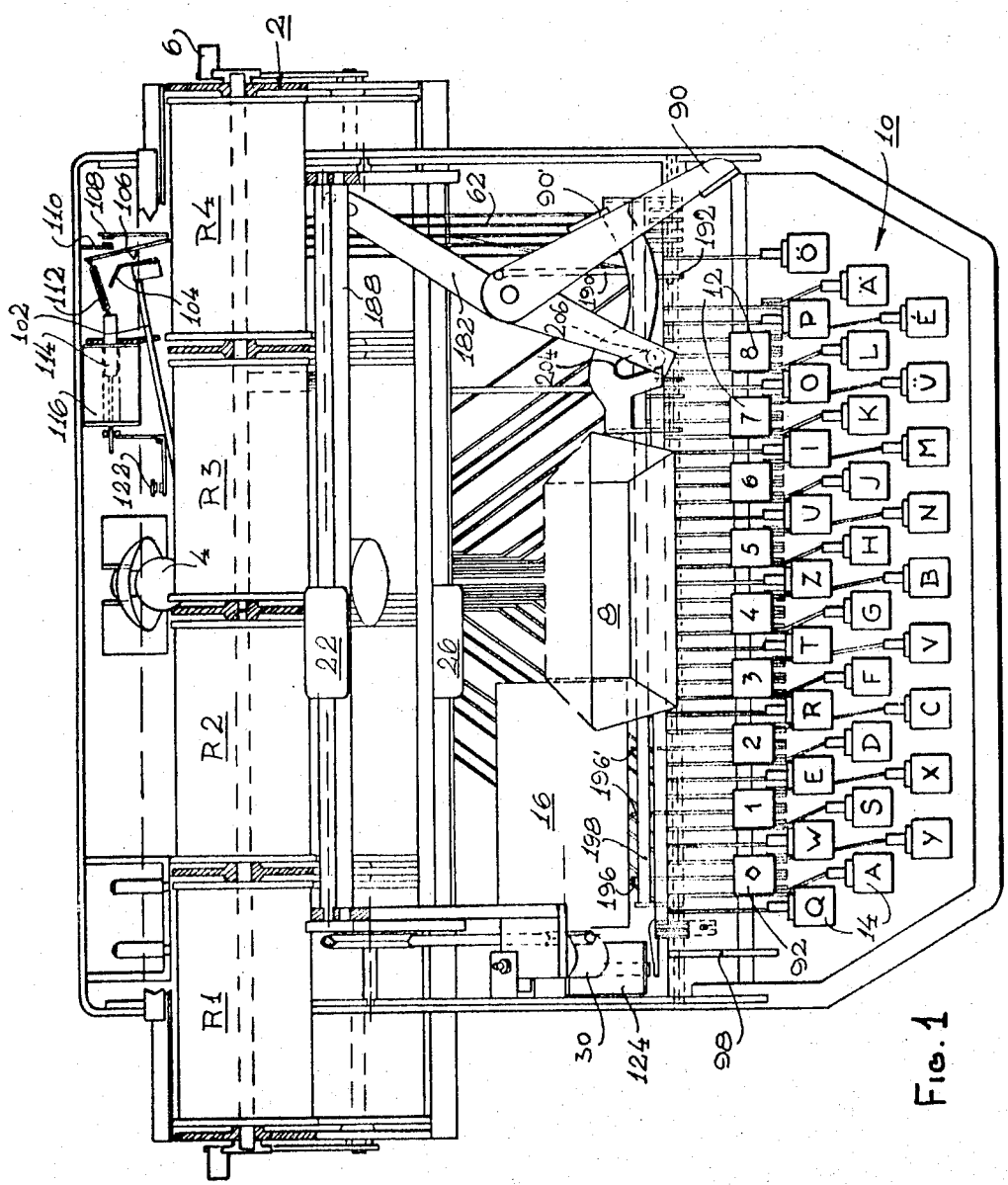

The present invention relates to data retrieval systems, and particularly to a system for retrieving microfilm data arranged in alphabetical order, such as in dictionaries, telephone directories, and the like.

An object of the present invention is to provide a data retrieval system which is compact, has a capacity for storing a great bulk of data, and permits such data to be selectively retrieved in a quick and facile manner.

Briefly, the invention provides a key-board controlled data retrieval system including a horizontally-shiftable carriage for supporting at least one microfilm reel, preferably a plurality of such reels, an optical projecting system for projecting data from the microfilm, and a drive for the reel. The key-board is used for introducing an address into the apparatus for selecting specific data to be projected, and control means are provided including an address reader for sensing address information on a microfilm, the control means controlling the reel drive in response to the address introduced through the keyboard to transport the addressed data to the optical projecting system. The data is arranged on the microfilm in a plurality of columns in alphabetical order. The column (e.g., which may include all the data beginning with the same letter) is first selected by depressing a key on the keyboard, and then the specific data called for is selected by depressing other keys.

The address information on the microfilm reel is also in microfilm form, and the address reader includes an optical system comprising a signal light source and a photocell for reading the address information. The keyboard controls a plurality of openable and closable shutters interposed between the signal light source and the photocell, the microfilm reel being supported so that its address information passes between the signal light source and the photocell, whereby the latter is controlled in response to the address information as well as to the conditions of the shutters.

Further features and advantages of the invention will be apparent from the description below.

The invention may take several forms, but is herein described with reference to the accompanying drawings which illustrate, somewhat schematically and by way of example only, a system for retrieving data (to which system I have applied the name "Automatic Microfilm Informations Accumulator and Selector," or "AMIAS") from a plurality of dictionaries. In the drawings:

FIG. 1 is a top plan view, with parts in section;
FIG. 2 is a transverse sectional view;
FIG. 3 is a top plan view, with parts in section, illustrating the structure of the stopping mechanism;
FIG. 4 is a transverse sectional view of FIG. 3;
FIG. 5 is a transverse sectional view of FIG. 4;
FIG. 6 is an enlarged view, similar to FIG. 2 but illustrating only certain elements of the address reader and other mechanism cooperable therewith;
FIGS. 7 and 8 are top and rear views, respectively, of the mechanism illustrated in FIG. 6;
FIG. 9 is a schematical representation of the main elements of the electrical circuit used in the machine of FIG. 1;
FIG. 10 illustrates a portion of the microfilm with which the machine of FIG. 1 is used;
FIG. 11 represents a table indicating the positions of the light shutters in the address reader to represent the character of the address introduced into the machine by the keyboard; and
FIG. 12 is a table representing the character of the address information appearing on the microfilm.

I. STRUCTURE OF MICROFILM

Reference is first made to FIG. 10 which illustrates the microfilm adapted to be used in the machine of FIG. 1.

This microfilm may contain eight complete dictionaries for translating from one language to another. Each dictionary occupies a portion of the microfilm reel and constitutes a batch of information. The film is about 70 mm. in width and is divided vertically into two sections, namely section $d$ containing the data information (i.e. the definition of the words), and section $a$ containing the address information.

Data section $d$ is arranged in vertical columns according to the letters of the alphabet. Thus, column A contains the definitions of the words beginning with the letter A, column B contains the words beginning with the letter B, etc. In this case, there are 30 vertical columns in section $d$, for containing (with reference to the English alphabet) all the letters A–Z as well as four special symbols arbitrarily indicated in FIG. 11 as A', O', U' and E'. Assuming that a vertical column of information in a standard dictionary is about 45–60 mm. wide, it may be reduced about $1/45$ to $1/60$ of its original size whereby the column will occupy about 1 mm. in width on the microfilm. Thus, the 30 columns in section $d$ of the microfilm will occupy about 30 mm. in width. By this reduction in size, one dictionary having about 40,000 entries would occupy about 1 meter of the microfilm. A reel containing 8 dictionaries would thus be 8 meters in length.

Address section $a$ of the microfilm is also divided into a plurality of vertical columns, each column being about 3.75 mm. in width. The rightmost column is indicated as the *ba* column and is adapted to contain the address of a batch of information, in this case the address of a complete dictionary. Since there are to be eight dictionaries in each reel of microfilm, this column would contain only eight different addresses, each address appearing at the beginning of its respective dictionary.

The remainder of address section *a* is divided into eight vertical columns, indicated as columns I to VIII. These columns represent in coded form the addresses of the respective words in the data section *d* of the microfilm. Thus, column I represents the second letter of the word (the first letter being selected by the use of one of the columns from section *d* as to be described); column II represents the third letter of the word; and so on through column VIII which represents the ninth letter of the word. In the illustrated arrangement, only nine letters are coded, as this takes care of the bulk of the words. The few words that require indexing more letters can be easily located within the very restricted portion of the microfilm indexed by the first nine letters. This will be more fully explained below.

FIG. 12 illustrates the code for identifying the letters in each of the vertical columns I–VIII. In each column, there are five code elements, each of which may be made (e.g., by photography) to be transparent or opaque. In the code illustrated in FIG. 12, the letter A is identified by five transparent elements, the letter B is identified by a first opaque element and then four transparent elements, the letter C is identified by a first transparent element, then by an opaque element, and then by three transparent elements, and so on. This same code is used in all the columns I to VIII. In data column *ba* for selecting the dictionary being identified by the code of the letter A the second by the code of the letter B, and so on through the eighth dictionary.

II. GENERAL CONSTRUCTION OF MACHINE

FIGS. 1 and 2 illustrate a machine adapted to carry four reels of microfilm, each according to the structure of FIG. 10, and to retrieve the data from each reel. Since each reel includes eight dictionaries, it is thus seen that the capacity of the machine illustrated in FIGS. 1 and 2 is 32 dictionaries.

Each of four reels, R1, R2, R3 and R4, is supported on a main carriage, generally indicated as 2 in the drawings, and is adapted to be aligned with the optical projecting system, including projector lamp 4, by moving the carriage horizontally on rails 5 (FIG. 2). Release of the carriage for moving it horizontally is effected by depressing carriage release lever 6 (FIG. 1) and then manually moving it to the desired position. The projector lamp 4 projects the data from the microfilm onto a screen 8 for viewing.

Once the desired reel is selected, the specific dictionary and the specific data within the dictionary are both selected by means of a keyboard, generally designated 10. This keyboard includes a group of number keys "1–8" indicated by the reference numeral 12, and a group of letter keys indicated by the reference numeral 14. The number keys 12 select the dictionary within the reel, and the letter keys 14 select the specific data within each dictionary The microfilm is driven by an electric motor 16 coupled by a belt 18 (FIG. 2) to a pinion 20 to drive roller 22 in one direction, belt 18 also being coupled by pinions 23 and 24 to drive roller 26 in the opposite direction, The latter two rollers are mounted at the ends of a T-shaped arm 28 which may be pivoted in one or the other direction by operating a reverse solenoid 30 to drive the microfilm in the forward or the reverse direction. Actually, arm 28 is biased by spring 32 in the forward drive direction and is actuated by solenoid 30 to pivot it to the reverse drive direction.

As the microfilm reel is driven in the forward direction, the microfilm passes through the optical projecting system, indicated by projector lamp 4, and also through an address reading system, indicated by signal lamp 40 (FIG. 2) and a photocell 42. The address reading system reads the address codes in section *a* of the microfilm, compares it with the address introduced in the keyboard, and controls the motor drive so that the data information appearing in section *b* of the microfilm is transported to the optical projector system where it is projected onto the screen 8.

The keyboard 10 introduces the address into the machine by controlling a plurality (five in this case) of light shutters 44 disposed in the address reader between the signal lamp 40 and photocell 42. One suitable mechanism for accomplished this is shown somewhat schematically in the drawings, and comprises, with reference to number key 14 (FIG. 2), a link 46 depressed by the key 14 which, through links 48 and 50, causes an arm 52 to pivot about its pivot 54, link 48 during this movement pivoting about pivot 56. Arm 52 may carry a preset element or rider 58 in any one or more of five positions. With respect to the arm 52 illustrated in FIG. 2, it is seen that the second and fourth positions contain riders 52 while the remaining positions are free. There is a separate arm 52 and set of riders 58 for each of the letter keys 14 and number keys 12. The presence of a rider opens its shutter 44, and a free place permits its shutter to remain closed. Thus the conditions of the shutters, after operation of the rider arm 52, will indicate the key depressed. FIG. 11 illustrates the arrangement of the light shutters (and also the riders) for indicating the various letters.

Extending across the width of the machine are five arms 60, one for each of the riders 52. Where a rider 58 is present, its respective arm 60 is pivoted. This movement is transmitted through a wire 62 to an arm 64 near the shutters 44. There are thus five wires 62 and five arms 64. Each of the arms 64 is pivoted on axle 64' and is formed with an extension 66 (FIGS. 6 and 7) which is pivoted downwardly during this operation into engagement with one of five further arms 68 each connected to one of the shutters 44. Each shutter is normally retained in its closed position by means of a spring 70 engaging another extension 72 of shutter 44 but is opened when arm 68 is moved downwardly. Extensions 72 of shutter 44 are also pivotally mounted on axle 64'.

A light shield 73 is disposed between the signal lamp 40 on one side and the shutters 44 and photocell 42 on the other side, and formed with a light slit 73'.

The letter keys 14 and number keys 12 are adapted to control the positions of the five shutters 44 in accordance with the code of the letter which the key represents, the code being determined by the arrangement of riders 58 on the arm 52 connected to each of the keys.

The machine includes means for effecting relative movement between the signal optical system and the microfilm one horizontal step or increment with each depression of a key on the keyboard, whereby each of the vertical columns in address section *a* of the microfilm can be read in succession. For this purpose, the machine includes a pair of intermediate carriages relatively movable with respect to each other. The first intermediate carriage is indicated at 74 (FIGS. 2 and 4) and carries the signal light 40, this carriage being movable along a pair of spaced rods 76. The second intermediate carriage is indicated at 78 and is also movable, along a pair of spaced rods 80. Each of the intermediate carriages 74 and 78 carries members of a stepping mechanism. That carried by carriage 74 is toothed member 82 (FIG. 3), and that carried by carriage 78 is bifurcated member 84 straddling member 82.

The initial position of both intermediate carriages 74 and 78 is determined by one of a plurality of wires 86 (FIG. 3) connected to the letter keys 14 by means of the latter's rider arm 52 (FIG. 2). There is one wire 86 for each of the letter keys 14, but no wires 86 are provided for the number keys 12. The wires 86 operate when the first address character is introduced into the keyboard to move the two carriages 74 and 78, as well as main carriage 2, to register the vertical column in the microfilm representative of that letter with the projector. With each subsequent depression of a letter key 14, indicating the second and subsequent characters, the carriage 74 is stepped one increment with respect to carriage 78, by means of another wire 88 (FIG. 3), so as to cause the signal lamp 40 and the photocell 42 to become aligned with each of the vertical columns in the address section *a* of the microfilm. The foregoing functions, as well as the detailed structure for accomplishing them, will be more fully explained below in connection with the description of specific machine operations.

The machine further includes a lever 90 causing the machine to be returned to the beginning of the dictionary; a key 92 causing the machine to be returned to the beginning of the reel; an arm 94 (FIG. 2) for adjusting the focus of the projector lens 96 in the optical projector system; and an arm 98 adapted to provide manual control of the reel, i.e., it by-passes the control exerted by the keyboard to operate the electrical drive. These will all be more fully described below.

III. MOTOR DRIVE CONTROL

Starting and stopping of the motor 16 are controlled by the position of shutters 44 and the coded information read by signal lamp 40 and photocell 42 from address section *a* of the microfilm. This control is effective, in the manner to be described below, to transport the addressed data in data section *d* of the microfilm into alignment with the optical projector system. Besides starting and stopping of the motor, the speed of the motor is also controlled so that it is reduced as the addressed portion of the microfilm approaches the projector. For this purpose, a roller 100 (FIG. 2) senses the speed of the microfilm and transmits this speed through shaft 102 (FIG. 1) to a centrifugal element 104. At a predetermined speed, the latter element is adapted to bear against and to move one side of an arm 106, the opposite side of the arm carrying a movable contact 108 engageable with a fixed contact 110. Contacts 108 and 110 control the electric motor 16 as will be seen from FIG. 9 of the drawings. A biasing spring 112 is connected to one end of arm 106 and urges contact 108 into engagement with contact 110. The opposite end of spring 112 is attached to armature 114 of a solenoid 116.

Spring 112, as indicated earlier, normally urges contact 108 into engagement with contact 110, but centrifugal element 104 moves the contact out of engagement when the speed of the motor exceeds a predetermined value. This speed is determined by the bias of spring 112. However, the latter bias is increased when the core 114 of solenoid 116 is pulled-in. The greater the magnitude of current in solenoid 116, the more the core 114 will be pulled-in. The amount of current within the solenoid will thus affect the speed at which the contacts 108 and 110 are disengaged by centrifugal element 104.

The circuit of the machine, schematically illustrated in FIG. 9, shows not only the control of the electric motor 16 by switch contacts 108 and 110, as described above, but also the circuit for the address reader. The latter includes signal lamp 40 and photocell 42. The signal lamp is controlled by a switch 118 (whose operation is described later) to cause photocell 42 to receive light whenever the positions of the shutters 44 do not correspond with the code elements in address column *a* of the film strip. All light will be blocked from the photocell only when the film is at the position addressed by the depressed key on the keyboard; in all other positions of the photocell it will receive light. When the film is not at the addressed position, photocell 42 generates current which is amplified in amplifier 120 and is applied to solenoid 116, then its armature 114 is not pulled in, and contact 108 is disengaged from contact 110, whereby the motor will not operate. However, if current is received by solenoid 116 from photocell 42, the armature 114 is pulled in, causing the two contacts to become engaged and energizing the motor 16. The motor will operate at a predetermined speed as determined on the one hand by centrifugal element 104, and on the other hand by the force exerted by spring 112 and the amount of current in solenoid 116; and the greater the current, the greater the speed of the motor, as described above.

In order to vary the current, each of the transparent code elements shown in FIG. 12, bordering on an opaque element in the same vertical column, may gradually become opaque so as to slow down the motor gradually before the opaque element is reached, at which time the motor should be stopped. Another arrangement for gradually varying the amount of light received by the photocell when it is to be stopped is to arrange the code markings on the microfilm such that the number of transparent elements decreases as the indexed address is approached.

Solenoid 116 also controls a switch 122 which is in the circuit to a locking solenoid 124. The latter solenoid controls a locking bail 126 (FIG. 2) which may be of a construction commonly found in typewriters for locking all the keyboard keys. The locking bail may be of a comb construction engageable with the rider arms 52 of the keys. Thus, the keyboard will be locked in the condition it then is whenever a current is flowing through solenoid 116, which means that whenever the motor 16 is in operation.

The circuit in FIG. 9 also illustrates the reverse solenoid 30 which is controlled by operating one of two switches 128 or 130 to be described later. Further, the circuit also illustrates the switch 132 controlling the projector lamp 4, also to be described later. If desired, a pair of indicator lamps 134 and 136 may be provided to indicate, respectively, when power is on and when the locking solenoid 124 is actuated.

IV. DESCRIPTION OF MACHINE OPERATIONS

Following are descriptions of the most important operations of the machine illustrated:

(A) *Selection of reel.*—The reel is selected by operating lever 6. This releases the carriage pemitting it to be moved horizontally until the selected reel is placed in alignment with the optical projector system, lamp 4. Any commonly-used means may be produced for releasing the carriage by lever 6, such as by providing the carriage with a bar 2' (FIG. 4) with four location slots 2", which bar is raised by lever 6 to unseat the slot from an end plate 140 carried by the intermediate carriage 78. Carriage 78 and carriage 74, together with the latter's signal lamp 40, remain in their normal positions during this operation.

(B) *Selection of dictionary.*—Each of the four reels carries eight dictionaries, the desired dictionary being selected by depressing one of the number keys 12. At the beginning of this operation, intermediate carriage 78 is in its rightmost position as shown in FIG. 4, against fixed end plate 142, and intermediate carriage 74 is also in its rightmost position, i.e. one position right of the position illustrated in FIG. 4, against end plate 144 carried by carriage 78. Carriage 74 includes an end plate 146 to which is connected a spring 148 urging the latter leftwardly, but both carriages are locked in position at this time. The above described condition of the foregoing elements will be apparent from a later described operation. In this condition of the intermediate carriages, the signal lamp 40 and photocell 44 are aligned with the *ba* address column in FIG. 10 and therefore read this column.

Depression of one of the number keys 12 moves the rider arm 52 for that key and positions the shutters 44 in accordance with the arrangement of riders for the depressed key, as descibed earlier. If the condition of the shutters 44 matches the code elements in column *ba*, indicating that the proper dictionary is already indexed, then no light will be received by photocell 42, and the motor will not operate. On the other hand, if light is received by photocell 42, indicating that the reel is not at the beginning of the indexed dictionary, solenoid 116 will become energized as described earlier, causing contacts 108 and 110 to close, energizing the motor 16. This will advance the reel to over-ride all the dictionaries until the light to photocell 42 is interrupted. This occurs when the reel is at the proper position for the dictionary indexed, at which time the operation of the motor will be terminated.

(C) Selection of first letter.—The first letter is selected by depressing one of the letter keys 14. This causes the main carriage 2, as well as the intermediate carriages 74 and 78, to slide to the columnar position with respect to the microfilm represented by the depressed letter key, in the following manner:

Depression of the letter key causes the wire 86 connected to the rider arm 52 for that particular key to be moved forwardly of the machine (upwardly as shown in FIG. 3), whereupon it projects into a slot 152 of an indexing device 154. As indicated earlier, there is a wire 86 for each of the letter keys 14 (but not for the number keys 12), and thus the actuated letter key will position its wire 86 in a particular position within slot 152.

Depression of the letter key 14 also moves a bail 88 rearwardly (upwardly as shown in FIG. 3), this bail being attached to a pair of side plates 88' (FIG. 2) engageable by arms 60. The bail is pivoted whenever an arm 60 is moved by the actuation of a key, as described earlier. Movement of bail 88 causes an arm 156 (FIG. 3) to unseat from a recess 158 in stepping member 84 carried by intermediate carriage 78. This results in the two intermediate carriages 78 and 74 moving leftwardly (FIGS. 3 and 4) by spring 148, until an arm 160 carried by corriage 78 intercepts the projected wire 86. At this time, arm 160 is pivoted, because of the cam formation of its leading edge, causing a nose 160' on its trailing end to pivot downwardly to seat in one of a plurality of teeth 162 fixed to the machine. A clip 164 (FIG. 4) carried by carriage 74 releasably retains arm 160 in the illustrated normal position or in the teeth-engaging position. Through end plate 140, which is fixed to intermediate carriage 78 and is seated in slot 2" of bar 2' of the main carriage, the main carriage also moves. This movement of intermediate carriage 74 carries with it the signal lamp 40. The shutters 44 and the photocell 42 are connected to carriage 74, as to be described below, so that they always move with it and with the signal lamp.

As indicated earlier, the normal starting position (i.e. when operating from a single dictionary) of intermediate carriage 74 is one space left of intermediate carriage 78, as shown in FIGS. 3 and 4. In this way, the signal lamp 40 carried by carriage 74 is in alignment with the I signal stripe, rather than the *ba* signal stripe, whereby the address reader reads the I column representing the second character of the word. This positioning of carriage 74 results from the action of a pawl 166 (FIG. 3), carried by stepping member 84, bearing on the left face of stepping member 82 carried by carriage 74, the latter carriage being biased against the pawl by means of spring 148. Pawl 166 is provided with a slot 168 which receives a pin 170 carried by member 84, the pawl being biased rightwardly against the left face of member 82 by means of a spring 172. The operation of the foregoing elements for stepping carriage 74 one increment with each key operation will be later described.

The depression of the first letter key 14 also indexes the shutters 44 as described earlier, but this has no effect on the machine since the signal lamp 40 is not energized. Thus, when the first letter is depressed, the carriages slide as described above but the reel drive is not operated.

(D) Selection of second and subsequent letters.—To index the second letter of the word on the keyboard, a letter key 14 for the second character is depressed. This causes several things to occur:

First, it causes the shutters 44 to assume the positions represented by the indexed letter, as described earlier.

Secondly, it causes one of the wires 86 to project into slot 152, but this does not affect the machine operation since arm 160 had been pivoted to its locking position, i.e. with its left end raised and its right end 160' seated within teeth 162.

Thirdly, depression of the second letter key causes bail 88 to move rearwardly (upwardly as viewed in FIG. 3), as described earlier. When this occurs, an arm 174 (which has come to underlie stepping member 84 of the intermediate carriage 78 by the movement of the latter during the preceding operation) engages the lower surface of member 84 and causes it to rise. Rising of the latter, causes pawl 166 to unseat from the left face of stepping member 82, but the latter member is retained in place by another tooth 176 on member 84 which moves upwardly with the latter to bear against the front face of member 82. Pawl 166 meanwhile moves rightwardly one increment by virute of slot 168, so as to be able to seat within the next tooth of member 82 when member 84 is normalized, thus effecting the stepping of carriage 74. The lifting of member 84 also closes switch 118 to the signal lamp 40 and switch 132 to the projector lamp 4.

Assuming that the reel is not in the position indexed on the keyboard, light will be received by photocell 42 causing the energization of solenoid 116 and the operation of motor 16 to drive the reel until light is no longer received by the photocell, in which case the reel is at its indexed position, as described earlier. At the same time, assuming photocell 42 receives light, locking relay 124 is also energized, by solenoid 116 closing contacts 122, whereby the keyboard is locked by locking member 126, with the depressed key locked in its depressed condition. It stays in this position until photocell 42 no longer receives light, whereupon solenoid 116 becomes deenergized and the motor drive deactivated.

When the motor terminates its operation by having transported the reel to the position indexed on the keyboard, and locking relay 124 is released, the depressed key is permitted to reutrn to its normal position, whereupon reel 88 is restored, permitting member 84 to descend to its normal position. Pawl 166, however, will have moved rightwardly one increment (as described earlier), whereupon the pawl will seat in the next tooth on member 82. Thus, the latter member, together with intermediate carriage 74 carrying the signal lamp 40, as well as the shutters 44 and photocell 42 connected thereto, as to be described below, will have moved one increment during this operation, aligning the foregoing elements with the II column on the microfilm.

Depression of the next letter key will thus cause the machine to read the number II column, to index the microfilm according to the second letter of the word address. This operation is repeated for every subsequent letter, until nine letters of the word have been entered.

Usually, nine letters would be sufficient to identify the word, or a least come close to it, so that very little further operation of the machine would be necessary. Further indexing of the machine, whenever necessary, is performed by manual control lever 98 (FIGS. 1 and 2) on the keyboard which is arranged to energize the electric motor directly, by-passing the address reader system. This manual control by lever 98 is schematically illustrated in FIG. 9 as operating an arm 98' adapted to move contact 108 into engagement with contact 110 to energize directly the motor 16. As schematically illustrated, lever 98 will merely drive the motor in the forward direction. It will be appreciated, however, that the lever 98 could also be arranged so that the opposite movement of the lever will also energize the reverse solenoid 30 to cause the reel to be driven in the reverse direction.

(E) Return to beginning of dictionary.—This operation is performed by moving lever 90 on the keyboard, which causes the following to occur:

First, lever 90, through its depending arm 90' coming into engagement with a link 182, causes the movement of further links 184, 185 and 186, (FIG. 2) the latter being connected to carriage 74. This results in the return of the latter carriage to the I position illustrated in FIGS. 3 and 4 (i.e. one increment left of the rightmost position), and with it the return of intermediate carriage 78 also to the illustrated position (to the rightmost position).

Secondly, lever 90, through the connection of link 182 with link 188 pivotably mounted on axle 188', causes the return of the photocell 42 together with the light shutters 44 to their normal positions. The signal lamp 40 was returned to its normal position with carriage 74, and it will be seen that by the linkage system illustrated in FIG. 2, particularly link 184 which connects link 182 with link 185, the photocell 42 assembly will always move with the signal lamp.

Operation of lever 90 also raises all the light shutters 44. This is accomplished by a wire 190 (FIG. 2) connected to a link 192 on lever 90 and moved backwardly when the lever is operated. Link 192 is carried on a rider arm similar to the illustrated arm 52, and in line with it, but having the riders in all five positions so that they move all the five arms 60, and thereby open all the shutters 44.

The bottom of the rider arm of link 192 is connected to a wire 193 (FIG. 4), the opposite end of the latter pivoting a link 194 (FIG. 4) carrying a pin 195 which closes contacts 118 to the signal lamp 40. The signal lamp is thus also energized.

Movement of lever 90 also reverses the reel drive. This is accomplished by a switch 128 (FIG. 9) which is closed when lever 90 is operated, energizing the reverse solenoid 30, to reverse the reel drive in the manner described earlier.

As all the shutters are open, the signal lamp 40 is energized, photocell 42 receives light, and therefore the motor operates driving the microfilm reel in the reverse direction until the reel reaches the beginning of that dictionary. Since the address reader reads the I column, this will be determined when the dictionary where all the code elements are opaque, thus blocking all the light to the photocell, whereupon the motor is de-energized. The locking solenoid 124 is energized all the time the photocell receive light, and therefore locking bail 126 locks the riders 52, including lever 90, during the operation of the motor.

(F) Return to the beginning of reel.—This operation is performed by depressing key 92. This key also has a rider arm with the riders in all five positions. When key 92 is depressed, this causes arm 196 (FIGS. 1 and 2) on the rider arm of key 92, to be pivoted upwardly, the latter arm engaging a shaft 198 connected across the opposite ends 200 of a bail 202. The latter is provided with a cam slot 204 in which rides a pin 206 depending from an end of arm 182. The arrangement is such that when key 92 is depressed, bail 202 moves forwardly, causing link 182 to be pivoted so that its end which is connected to intermediate carriage 74 (as described above) forces the latter to the extreme right position (as viewed in FIGS. 3 and 4) whereupon the signal lamp 40 is in alignment with column ba of the address data on the microfilm. The address reader is thus in position to read this column of the microfilm.

The same operation of returning the carriage 74 to the ba column is performed when any of the number keys 12 is depressed, each of these latter keys also being formed with an arm 196' (FIG. 1) comparable to arm 196 of key 92.

The return of carriage 74 to the extreme right position causes pin 208 (FIG. 3) to close contacts 118 thus energizing the signal lamp 40. In addition all the shutters are open by the rider arm for key 92. The reverse solenoid 30 is also actuated by a switch 130 closed by key 92. Accordingly, the photocell signal lamp 40 will scan the ba column on the film until it reads the five opaque elements at the beginning of the reel, at which time the drive will terminate.

When the machine illustrated is used for retrieving data from many dictionaries (up to 32 as described earlier), the letter keys 14 could be made inter-changeable so as to indicate the different letters of the various dictionaries. For example, they may be made so that they can be rotated to present a different language letter; or they may be made so that they can be quickly and easily removable for attaching other language letter keys.

Preferably, the address data is in the form of opaque and transparent code elements as shown, but it will be appreciated it could be in the form of magneted elements, conductive elements, or the like.

There are many other applications for the data retrieval system described. For example, it could be used for retrieving information from telephone directories, encyclopedias, personnel cards or photographs, parts lists of complicated machines, inventory items, and the like. It could also be used as a teaching machine. In addition, it could be used as a memory for an electronic computer.

Many other variations and applications of the embodiment illustrated could be made within the scope of the invention as defined in the following claims.

I claim:

1. A data retrieval system, particularly for use in retrieving data arranged in alphabetical order, such as in dictionaries and telephone directories, comprising a horizontally-shiftable carriage for supporting at least one microfilm reel containing data in microfilm form arranged alphabetically in columns the microllm reel also containing coded address information pertaining to satd data, an optical projecting system for projecting said data from the microfilm, a drive for said reel, a keyboard including a plurality of depressible keys for introducing into the apparatus an address for selecting special data to be projected, carriage-shifting means for horizontally shifting the carriage to a predetermined columnar position according to a key of the keyboard depressed, and control means including an address reader sensing said address information on the microfilm for controlling said reel drive actrding to other keys of the keyboard depressed to transport the addressed data to the optical projecting system.

2. A system according to claim 1, wherein said carriage is adapted to support a plurality of microfilm reels, said carriage being horizontally movable to a plurality of preselected positions tt align a selected microfilm reel with said optical projecting system.

3. A system according to claim 1, where said reel drive is an electric motor and said control means includes a spring and a speed-responsive switch adapted to open against the bias of said spring to control the speed of the motor, said control means further including a solenoid arranged so as to vary the bias of said spring by a force decreasing with a decrease in the amount of current flowing through said solenoid, said control means further including an electrical circuit which provides decreasing current to said solenoid with the approach of the selected address on the microfilm reel.

4. A system according to claim 1, wherein said address information on the microfilm reel is also in microfilm form, and wherein said address reader includes a signal optical system comprising a signal light source, a photocell for reading said address information, and a plurality of movable shutters interposed between said signal light source and photocell and controlled by said keyboard.

5. A system according to claim 4, wherein there is included stepping means controlled by said keyboard for effecting relative movement between said signal optical system and said microfilm for each operation of a key on the keyboard.

6. A system according to claim 5, wherein said stepping means comprises first and second intermediate carriages relatively movable with respect to each other, said address reader being carried on said first intermediate carriage and being horizontally movable relative to the microfilm.

7. A system according to claim 6, wherein said second intermediate carriage is also horizontally movable relative to the microfilm.

8. A system according to claim 7, wherein said keyboard includes means for controlling said second intermediate carriage such that it moves horiztntally with the first intermediate carriage to a preselected position with respect to the microfilm upon depression of a key representative of an address character of the data to be retrieved, said keyboard including means for controlling the first intermediate carriage such that it is horizontally stepped with respect to said second intermediate carriage with every depression of a key representative of the next and subsequent address characters of the data to be retrieved.

9. A system according to claim 8, wherein said keyboard includes a key operative to return said second intermediate carriage to its starting position and said first intermediate carriage to one stepped position from its starting position.

10. A system according to claim 9, further characterized in that said keyboard includes another key operative to return both said first and second intermediate carriages to their starting positions.

References Cited

UNITED STATES PATENTS

| | | | |
|---|---|---|---|
| 2,085,744 | 7/1937 | Foster | 352—176 |
| 2,323,372 | 7/1943 | Bryce | 88—24 |
| 2,482,242 | 9/1949 | Brustman | 88—24 |
| 2,783,454 | 2/1957 | North | 88—1 |
| 3,267,800 | 8/1966 | Baillod | 88—1 XR |
| 3,290,987 | 12/1966 | James et al. | 88—1 XR |

NORTON ANSHER, Primary Examiner

R. M. SHEER, Assistant Examiner

U.S. Cl. X.R.

353—74